Aug. 25, 1970 R. J. GARGRAVE 3,525,183
DUST COLLECTOR
Filed July 17, 1967
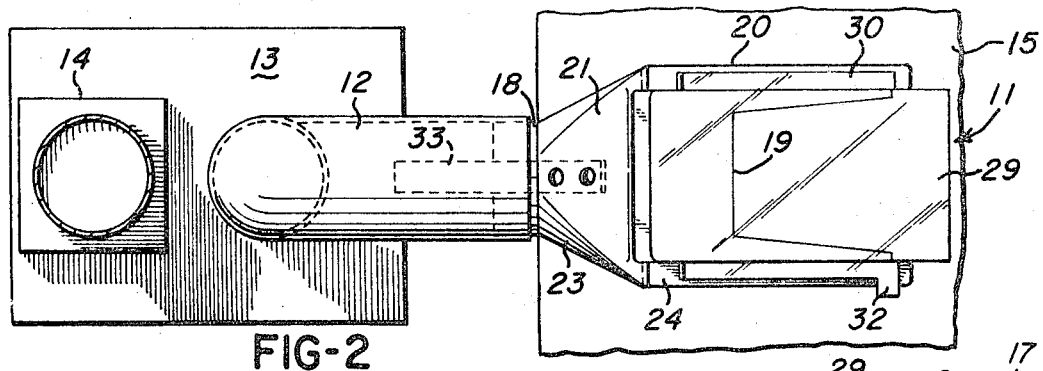
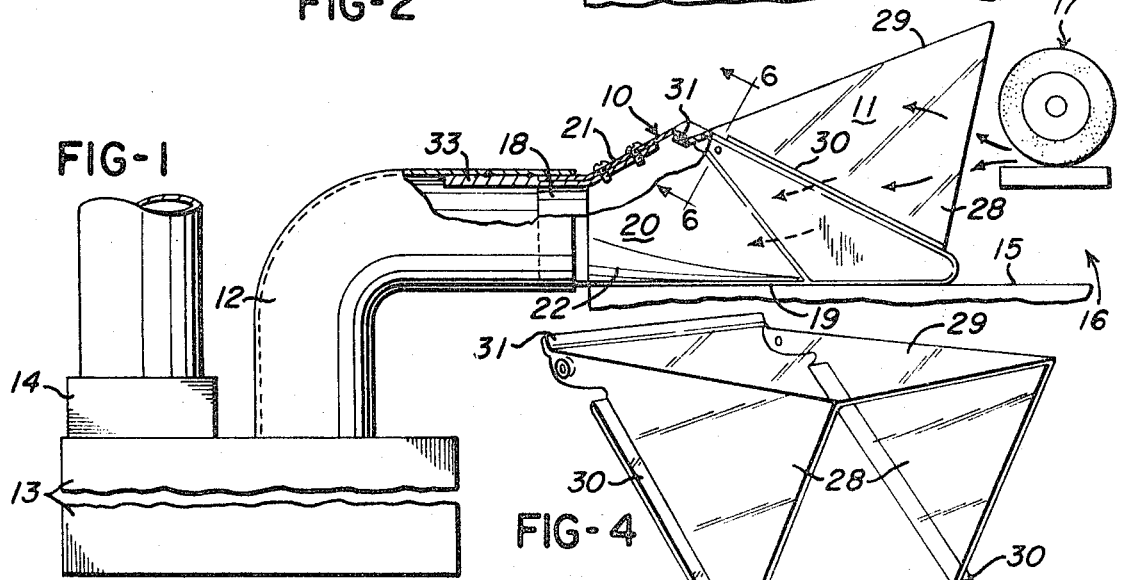
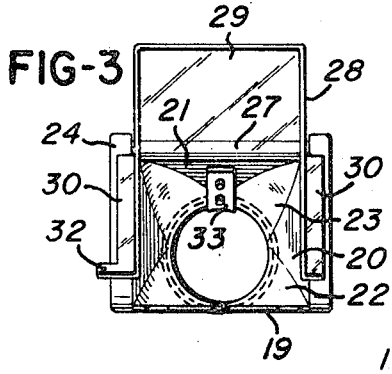
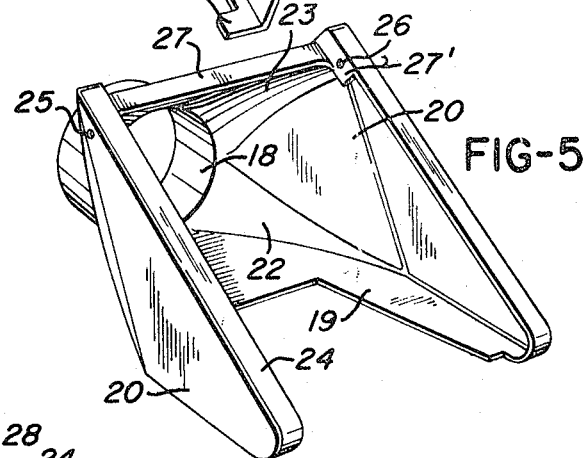
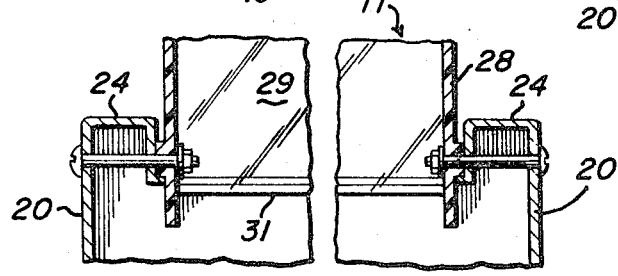
INVENTOR
ROBERT J. GARGRAVE
BY Jerome P. Bloom
ATTORNEY

United States Patent Office 3,525,183
Patented Aug. 25, 1970

3,525,183
DUST COLLECTOR
Robert J. Gargrave, Dayton, Ohio, assignor to Day/ton Progress Corporation, Dayton, Ohio, a corporation of Ohio
Filed July 17, 1967, Ser. No. 653,729
Int. Cl. B24b 55/06
U.S. Cl. 51—270                                                    11 Claims

ABSTRACT OF THE DISCLOSURE

A portable dust collecting system featuring a novel hood having entrance and exist ends, the entrance end having a wide mouthed configuration enabling the hood to substantially embrace a work area and being formed in part by a retractable, transparent, cover section which provides a uniquely constant and ready access to the work area.

---

This invention relates to improvements in dust collecting systems. It has particular though not limited application for use on and in connection with machine tools. Embodiments are easily applied to collect and effectively dispose of vapors and the particles of dust, grit and liquids which are variously produced in the working area of a machine tool.

Dust collecting systems of the class described have in the past suffered from certain disadvantages. Primarily designed for a specific application, they are usually bulky, consume considerable amounts of space and are costly from both an installation and a maintenance standpoint. It has not heretofore been possible to position a dust collector so its inlet could dispose constantly in the most favorable relation to a machine tool. Moreover, the prior art dust collector of the nature here contemplated is normally incapable of effecting a thorough disposal of vapors, grit, dust and liquids, let alone being able to shield a machine tool while providing ready access to its work area. Also, it has not heretofore been possible to effectively use a low level vacuum system in conjunction with dust collectors of the class described. This last is due, in part, to the fact that the average collector system is characterized by a hood which offers considerable flow resistance and a lack of a proper proportional relationship between its inlet and outlet openings.

The present invention affords an optimal solution to the above mentioned problems. In so doing it enables a unique, relatively portable, dust collecting system, to be further described.

A primary object of the invention is to provide an improved means for dust collection which is economical to fabricate, more efficient and satisfactory in use, adaptable to a wide variety of applications and unlikely to malfunction.

Another object of the invention is to provide a unique dust collector hood the operation of which is characterized by an improved dispersal pattern.

A further object of the invention is to provide a hood having a novelly defined inlet which may be releasably fixed in a constant most favorable relation to an operating machine tool.

An additional object of the invention is to provide a collecting system including a uniquely contoured hood portion of which is made transparent to facilitate viewing while providing a working shield for such area.

A still further object of the invention is to provide a dust collection unit capable of effectively dispersing sprayed waste materials using a relatively low level of applied vacuum.

Another object of the invention is to provide a dust collecting system including a uniquely contoured hood providing means facilitating a most effective support of a connected exhaust tube which connects, in turn, to a simple collection box.

A further object of the invention is to provide an improved dust collection system and components thereof which possess the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing where in is shown one but obviously not necessarily the only form of embodiment of the invention, FIG. 1 is a generally diagrammatic view of a dust control or collection system incorporating a unique hood structure, as prescribed by the present invention;

FIG. 2 is a top view of the structure of FIG. 1;

FIG. 3 is a view of the inlet end of the aforementioned hood structure;

FIG. 4 is a perspective view of a retractable section of the hood;

FIG. 5 is a perspective view of the hood with the retractable section removed; and FIG. 6 is a cross-section view taken on line 6—6 of FIG. 1.

Like parts are indicated by similar characters of reference throughout the several views.

The drawings illustrate an invention embodiment as applied to a surface grinder which may be operated under wet or dry conditions. The system shown includes a collector hood 10 with a retractable cover section 11, a flexible suction hose 12, a collection box 13 and, applied to the box 13 a vacuum pump 14.

The hood 10 is releasably fixed to a portion of the machine table 15 of a surface grinder 16 to dispose its entrance end in an adjacent embracing relation to the working area of a grinding wheel 17.

In the example illustrated the hood 10 is formed as a one piece body, preferably of sheet metal or like material. In transverse section its wall structure has a generally rectangular configuration except at its exit end 18. The latter has a tubular configuration. Forwardly of the tubular end portion 18 the hood 10 has an expanding funnel-like form, the wall structure thereof comprising a flat elongated plate-like base section 19, sides 20, and a short upwardly inclined top section 21.

In extending forwardly of the exit portion 18 the sides 20 first diverge and then run parallel to define the lateral extremities of the entrance end of the funnel. The lower edges of sides 20 run coextensively with the lateral edges of the base section 19 and connect thereto. The lower divergent edge portions of the sides 20 are interconnected to the base 19 by means of flatly arcuate wall sections 22. The uppermost edge portions of the sides 20 are relatively short and upwardly inclined to run coextensively with the top section 21 and connect with its lateral edges by means of flatly arcuate wall sections 23. Since their top edges are short and bottom edges long, the foremost edges of the sides 20 incline sharply in a sense upwardly and rearwardly from the extremity of the base section 19 at the entrance end of the hood 10. These foremost edges are coextensively formed with transversely aligned, inwardly directed, coplanar, right angled flanges 24. The flanges 24 provide a firm seat for the cover section 11, as will be further described.

Intermediate the uppermost extremities of the flanges 24 the forward edge of the top section 21 is relatively depressed to form an inwardly projected flange 27. The flange 27 disposes in spaced generally parallel relation to, and in a sense inwardly of, the plane mutually defined by the flanges 24. The flanges 24 and the relatively adjacent extremities of the flange 27 are respectively interconnected by plate portions 27'. The latter have transversely aligned apertures 26. The sides 20 have apertures 25 which are directly aligned with the apertures 26.

The cover 11 is fabricated in this instance, of transparent plastic material. Per se it has a hood-like form, being comprised of oppositely disposed, parallel plate-like side walls 28 and an interconnecting top plate or wall 29. The side walls 28 have an identical triangular configuration and their transversely aligned lower edges are similarly formed with out-turned flanges 30. The rearmost extremity of the top plate 29 extends beyond the side plates and has formed thereon a rearwardly and upwardly directed flange portion 31. The latter is adapted to be received between the flanges 24 and to hook directly under the flange 27 on the foremost extremity of the top section 21 of the hood 10. The side walls 29 include dependent ear portions which dispose in juxtaposition to the plate elements 27' and include apertures which align with the adjacent apertures 25 and 26 to accommodate the projection therethrough of the hinge pins illustrated in FIG. 6 of the drawings. The cover section 11 is hinged thereby to the body of the hood 10.

The flange 27 is employed as a limiting abutment for the flange 31 of the cover section 11, in which instance the cover flanges 30 are adapted to assume a firmly seated relation to the flanges 24 on the body of the hood. The dimension, weight and contour of the cover 11 is such as to provide a seal with the flanges 24 and 27.

Accordingly, the hood is provided with a retractable hinged cover section. As may be observed from the drawings, the top plate 29 of the cover 11 projects in an overlapping preceding relation to the base section 19 at the entrance end of the hood. The foremost edges of the side walls 28 incline upwardly and forwardly of the flanges 24 in a similarly projected fashion. Note further, with reference to FIG. 4 of the drawings, that the cover section 11 has a tab 32 formed integral with one of its flanges 30 to project laterally outward thereof at the entrance end of the hood. By means of the tab 32 one may obviously readily manipulate the cover section 11 from its seated position to an open displaced position and vice versa.

Observing the drawings further, it may be seen that at its entrance end the base section 19 has a rectangular cut-out to provide to either side thereof portions which may be bolted or otherwise releasably secured to the table 15 to fix the hood 10 in a stationary position to have its entrance end embrace the work area of the grinding wheel 17.

From the preceding description, it may be readily seen that the hood 10 having a relatively flat base 19 may be firmly fixed in a position of rest against any planar surface of a machine tool. The base cut-out facilitates clearance of machine structure and disposing the entrance end of the hood in a closely embracing relation to the work area of a tool, in the example illustrated a grinding wheel 17. FIG. 1 of the drawings illustrates that forward inclination of the entrance end of the cover section effects an overlap of the working area, enabling, in the operation of the grinding wheel, an effective interception of the dust and vapors flaring out and rising from the working point. By the same token, the closeness of the base section 19 facilitates that it receives thereon or immediately adjacent thereto, in underlying relation to cover 11, the grit and shavings which may be thrown outwardly and downwardly from the working point.

Referring to FIGS. 3 and 5 of the drawings, it will be there seen that at its entrance end the interior of the hood 10 has a channel-like form expanded both vertically and laterally. In contrast the rearmost end of the hood has the form of a smoothly contoured funnel convergent to its focal point which is defined by its tubular exit portion 18. The latter, of course, defines the outlet from the hood.

The funnel-like described form of the hood, including its cover section 11, affords an optimally contoured unobstructed passage for waste materials to be free to move longitudinally through the collector hood and to be accelerated in passage therefrom by way of the tubular end section 18. To the latter is telescopically attached the flexible suction tube 12 which leads to the collection box 13. Mounting over an opening to the collection box 13 is the vacuum pump 14 which on energizing thereof is designed to apply to the box 13, tube 12 and hood 10 a low level of vacuum. As should be obvious, the low pressure vacuum exerts a condition of low pressure in the collector hood which in turn induces a flow of ambient air to the entrance end of the hood. This air flow is sufficient to carry with it the dust and vapors generated in the work area of the grinding wheel 17 which is encompassed by the entrance of the hood. Further, the moving air influences the grit and shavings which are thrown on or adjacent the base section 19 to move inwardly of the hood, to the tube 12 and into the collector box 13. The heavy finds fall to the bottom of the collector box 13 while the dust and vapors are ejected by way of the vacuum pump and suitably related conduit to be appropriately vented or scrubbed, as the case may be. In any event the dispersal of the dust, vapors and particles created in the working area is essentially simultaneous with their occurrence and complete. The nature of the operation is such that where a fluid is employed in the grinding procedure, here represented, the liquid particles which are flung out in the grinding operation are caught up and carried with the particles of dust to leave the working area relatively free of undesirable sediment. The ability of the system to accomplish this much is enhanced by the minimal nature of the applied vacuum. The flow is swift and effective but not so swift as to create turbulence and cause ejection from or in the entrance end of the hood of sediment.

Note that the retractability of the cover 11 facilitates inspection and wiping the hood interior. Observing FIGS. 1 and 2 of the drawings, a free and unhampered flow from the hood 10 to and through the conduit 12 is insured by a supporting bracket 33 fixed to the inner surface of the top section 21 of the hood 10. The bracket 33 has a finger-like portion which extends rearwardly and outwardly of the tubular end portion 18, at the top center thereof, to underly and structurally dispose the flexible conduit 12 in a supported condition which prevents kinking or reduction of its cross-sectional area.

It has been found that for optimal effectiveness the cross-sectional area of the opening to the entrance end of the hood should be approximately five times that of the outlet opening defined by the tubular exit portion 18. This enables a highly desirable flow pattern and permits the low level of vacuum applied to the box 13 to be utilized in a most effective manner. In the operation of the collector system in the case of an installation of multiple collector hoods connected to a central source of vacuum, the low level of the vacuum employed makes it unnecessary that hoods not in use be disconnected in order that an effective vacuum may be generated in the hoods in use. It is significant in adopting the invention system that the simple finger support of the flexible suction tube 12 causes the latter to assume a smoothly curving contour utilizing to best advantage the effect of the gravity pull on the waste materials which are induced to flow interiorly of the hood and through the tube.

It should be apparent that the system illustrated is relatively portable since on a simple disconnection of the bolts attaching the base section 19 to the machine table the few parts involved may be readily applied to another machine. By the same token, the simple connection enables a ready change in the orientation and disposal of the entrance end of the hood in reference to machine having more than one cutting tool position.

The collector box is particularly advantageous for use in the collection of heavier wet finds. The box might, moreover, be provided with a damping or neutralizing agent should the collected materials be flammable or of an otherwise hazardous nature.

It should be further obvious that the simple system has the advantage that it may be used with a central vacuum source as well as being made self-contained by the application to the collector box 13 per se of the vacuum pump 14.

From the preceding it should be readily apparent that a very simple, exceedingly economical, and universally adaptable collector system derives from the present invention which may be advantageously employed in conjunction with a variety of machine tools. It is a characteristic of the use of invention embodiments that in any instance they accomplish an extremely high reduction of air pollution in a machine shop. Also, they are low in cost to install and maintain and occupy a minimum amount of space. Installations where embodiments have been employed have borne out these facts.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Apparatus for collecting dust, vapors and solids produced in the operation of grinders and like cutting tools comprising a funnel-like hood unit having a base adapted for a releasable fixed attachment to a machine frame to dispose its entrance end in a constant most favorable position to embrace the working area of a cutting tool, said entrance end including an overlying hood portion arranged to provide access to said cutting tool and so disposed to intercept the dust and vapors which tend to rise and flare out from the point of their production at the cutting tool and the base of said hood unit being so related to receive grit and shavings which are projected downwardly from the point of their production at the cutting tool, said entrance end providing the maximal cross sectional area of said hood unit and the remote discharge end of said hood unit having a form providing its minimal cross sectional area, the entrance end of said overlying hood portion projecting to dispose itself in overlapping relation to the entrance end of said base.

2. Apparatus for collecting dust, vapors and solids produced in the operation of grinders and like cutting tools comprising a funnel-like hood unit having a base adapted for a releasable fixed attachment to a machine frame to dispose its entrance end in a constant most favorable position to embrace the working area of a cutting tool, said entrance end including an overlying hood portion arranged to provide access to said cutting tool and so disposed to intercept the dust and vapors which tend to rise and flare out from the point of their production at the cutting tool and the base of said hood unit being so related to receive grit and shavings which are projected downwardly from the point of their production at the cutting tool, said entrance end providing the maximal cross sectional area of said hood unit and the remote discharge end of said hood unit having a form providing its minimal cross sectional area, the base of said hood unit including a substantially flat portion adapted for a flush seat to a machine table or like surface and said overlying hood portion being inclined upwardly therefrom in the direction of the entrance end of said funnel-like hood unit, said overlying hood portion having a hinged relation to the remainder of said funnel-like hood unit and being generally triangular in side elevation and per se defining the top and substantially the two vertical sides of the entrance end of said hood unit.

3. Apparatus for collecting dust, vapors and solids produced in the operation of grinders and like cutting tools comprising a funnel-like hood unit having a base adapted for a releasable fixed attachment to a machine frame to dispose its entrance end in a constant most favorable position to embrace the working area of a cutting tool, said entrance end including an overlying hood portion arranged to provide access to said cutting tool and so disposed to intercept the dust and vapors which tend to rise and flare out from the point of their production at the cutting tool and the base of said hood unit being so related to receive grit and shavings which are projected downwardly from the point of their production at the cutting tool, said entrance end providing the maximal cross sectional area of said hood unit and the remote discharge end of said hood unit having a form providing its minimal cross sectional area, said hood unit being comprised of a body element including said base and being formed at said remote end with a tubular extension providing a discharge opening from said hood unit, said body element having at its opposite end an opening which is substantially framed by three flanged portions at least two of which lie in a common plane inclining to and rearwardly of said hood base, said overlying hood portion being provided by a displaceable element the sides of which normally seat to said flanged portions to define thereby an enlarged entrance end for said hood unit.

4. Apparatus as in claim 1 characterized by said overlying hood portion to the entrance end of said body being defined by a retractable section including a top normally forwardly projected cover section having forwardly inclined laterally spaced side walls.

5. Apparatus as in claim 4 characterized in that the base of said hood unit is provided on a funnel contoured body section including side walls providing means defining inclined surfaces for seating the side walls of said overlying hood portion.

6. Apparatus for collecting dust, vapors and solids produced in the operation of grinders and like cutting tools, comprising a collector body having oppositely disposed entrance and outlet ends and adapted to be mounted with its entrance end facing a work area, the entrance end comprising forwardly projecting laterally spaced apart sidewalls inclining rearwardly along their upper edges in a common plane from forward extremities toward said outlet end, lower edges of said sidewalls being turned inward to define a bottom adapted to be fixed to a supporting surface, said body being open at its top between said sidewalls, a cover adapted to assume a position of rest on said sidewalls and having sides forming upward continuations of said sidewalls and an interconnecting top member projected by said sides to be disposed as an angularly extending deflector over the entrance end of said body, said cover cooperating with said sidewalls to define a wide mouth at the entrance end of said body to allow a close approach of the hood into the work area.

7. Apparatus as in claim 6 wherein said body sides are of generally triangular configuration and said cover is pivotally connected to said body at apices of said triangular sides allowing it to be retracted in a direction away from the work area for access thereto.

8. Apparatus according to claim 6, characterized in that the outlet end of said body is constructed as a closed section of the body terminating at its one end in said forwardly projecting sidewalls and terminating at its opposite end in means defining an outlet opening, portions of said closed section of said body being formed in inclined planes to give said outlet end a funnel-like shape, said outlet opening being smaller than the relatively wide mouth at said entrance end in a proportion on the order of one to five.

9. Apparatus according to claim 6, characterized in that lower edges of the sides of said cover have laterally bent flanges to seat on said side walls of said body, one of said flanges having a tab thereon whereby said cover may be lifted about one end from a closed position of rest on said sidewalls to a relatively elevated open position.

10. Apparatus according to claim 6, characterized in that said sides of said cover terminate at one end in extensions pivotally connected to said sidewalls adjacent upper ends thereof, said cover being retractable by lifting it about said one end thereof, said body providing an inclined surface against which said top member of said cover is brought to one position of rest.

11. Apparatus for collecting dust, vapors and solids produced in the operation of grinders and like cutting tools, including a collector hood, said hood having a flat bottom section to seat on a machine table or the like and to provide means for stationary mounting of the hood in a constant favorable relation to table supported machining means, said hood having oppositely disposed inlet and outlet ends, the interior of said hood being open for a free flow of air therethrough into said inlet end to and through means defining an opening in said outlet end, a substantially air tight collector box beneath the level of said hood, conduit means for connecting the interior of said box to a vacuum source, and other conduit means connecting of the box interior to the outlet opening of said hood, said other conduit means being a tube having an open cross sectional area throughout its length at least equal to that of said outlet opening and positioned smoothly to conduct waste material away from said hood and down to said box, heavy and wet waste materials dropping into the bottom of said box and remaining there while dust and vapor exit to said vacuum source, the said inlet end of said hood being open and having at least one side section the upper edge of which is widely divergent relative to the bottom of said hood to create a wide mouth enlarged relative said outlet opening.

References Cited

UNITED STATES PATENTS

| | | | |
|---|---|---|---|
| 956,762 | 5/1910 | Furrow | 51—273 |
| 1,047,571 | 12/1912 | Sadler | 51—272 |
| 1,174,659 | 3/1916 | Bilicki | 51—273 |
| 1,797,261 | 3/1931 | Hallam | 51—270 |
| 2,711,620 | 6/1955 | Shelby | 51—273 |
| 3,401,724 | 9/1968 | Kreitz | 51—273 X |

OTHELL M. SIMPSON, Primary Examiner